Patented Aug. 28, 1951

2,565,537

UNITED STATES PATENT OFFICE 2,565,537

SYNTHESIS OF BETA-CYANOPROPIONALDEHYDE AND RELATED COMPOUNDS

Donald T. Warner and Owen A. Moe, Minneapolis, Minn., assignors to General Mills, Inc., a corporation of Delaware No Drawing. Application August 8, 1949, Serial No. 109,222

7 Claims. (Cl. 260—465.1)

The present invention relates to the preparation of beta-cyanopropionaldehyde and to alpha- and beta-alkyl substituted beta-cyanopropionaldehyde.

According to the present invention, these compounds are prepared by the 1,4 addition of hydrogen cyanide to acrolein, methacrolein and crotonaldehyde.

Numerous previous references have described the 1,2 addition of HCN to acrolein to yield acro lein cyanohydrin (e. g., Rambaud, Bull Soc. Chim., 1, 1317-41, (1934) as described in Chem. Abs., 29, 1775 [4], (1935)). Beta-cyanopropionaldehyde has been previously prepared from acrolein by a multiple step reaction (Tanaka, J. Pharma. Soc. Jap., 60, 19-22, (1940); see also Chem. Abs., 34, 5446 [7], (1940)). This synthesis involved the conversion of acrolein to beta-chloropropionaldehyde diethylacetal, reaction with an alkali cyanide to yield beta-cyanopropionaldehyde diethylacetal, and hydrolysis of the acetal to yield the free aldehyde.

In contrast with these prior reactions, the present invention involves the direct reaction of hydrogen cyanide with acrolein or substituted acroleins, such that 1,4 addition results, and the beta-cyanopropionaldehyde results directly. We have discovered that this reaction may be caused to occur by heating a mixture of hydrogen cyanide and acrolein in a lower aliphatic alcohol solvent at an elevated temperature for an extended period of time and in the presence of an alkaline catalyst. The beta-cyanopropionaldehyde formed may be separated from the reaction mixture by distillation or by the preparation of a suitable derivative, such as the 2,4-dinitrophenylhydrazone.

The aldehydes which may be employed in the reaction include acrolein, methacrolein, and crotonaldehyde, which result in the formation of beta-cyanopropionaldehyde, alpha-methyl-beta-cyanopropionaldehyde, and beta-methyl-beta-cyanopropionaldehyde, respectively. The solvents which may be employed include the lower aliphatic alcohols, methanol, ethanol, propanol, isopropanol, and the like. The alkaline catalysts include the alkali metal alkoxides, tertiary amines, quaternary ammonium compounds, and the like. In general, best yields of the aldehyde compounds are obtained when the amount of catalyst is held within the range of approximately 0.001 to 0.10 mole per mole of reagent used. This is a preferred catalyst range and is preferred particularly for the stronger catalysts such as the alkali metal alkoxides. Where weaker alkaline catalysts, such as the tertiary amines or the quaternary ammonium compounds, are used more leeway in the amount of catalyst employed is possible. Generally it is desirable to employ as small a quantity of catalyst as is conveniently possible inasmuch as larger quantities tend to enhance the possibility of aldehyde polymerizations. In the case of the weaker alkaline catalysts, such as the tertiary amines, it has been found that the amount of catalyst which may be employed is considerably greater on the molar basis than that set forth above without any adverse effect on the yield.

In carrying out the reaction a solution is made of the acrolein and the hydrogen cyanide in the solvent. The catalyst is then added and the mixture heated to an elevated temperature for an extended period of time, for example, from one to three hours, preferably at a temperature near the reflux temperature. Thereafter the catalyst is neutralized and the solvent removed by distillation. The beta-cyanopropionaldehyde may then be extracted from the reaction mixture by means of a solvent and recovered by distillation from the solultion. It is also possible to form a suitable derivative such as the 2,4-dinitrophenylhydrazone of the beta-cyanopropionaldehyde in the crude reaction mixture and isolate this phenylhydrazone.

Reaction temperatures of from 50–100° C. and time periods of from about one to four hours at these temperatures are satisfactory for the production of the desired products.

The following examples will serve to illustrate the invention:

*Example 1*

Acrolein (52.6 g.) was diluted with absolute ethanol to a volume of 500 ml. Liquid hydrogen cyanide (53.2 g.) was added and the resulting solution was cooled to +5° C. To the cooled reagent mixture, a solution of sodium ethoxide (prepared from 0.1 g. sodium and 50 ml. absolute ethanol) was added in small portions with intermittent cooling so that the reaction temperature did not exceed 30° C. The reaction mixture was then placed in the refrigerator for approximately 40 hours. The total volume of the reaction mixture was 600 ml.

Approximately 300 ml. of the reaction solution was heated at 50–60° C. for one hour and then refluxed for a period of 45 minutes. The catalyst was neutralized with 1 ml. of glacial acetic acid and the solvent was removed in vacuo. The residue was extracted with ethyl ether. A large portion of the material dissolved in ether, and the ether solution was washed with water. The ether solution was then dried with anhydrous $Na_2SO_4$, the ether was removed and the product was distilled in vacuo. Beta-cyanopropionaldehyde was obtained as an oil having a sweet odor. Most of the product was collected over the range of 75–90° C./1.0–0.7 mm.

Beta-cyanopropionaldehyde was identified as the semi-carbazone, M. P.=162–163° C. (given in literature, M. P.=163° C.) and the phenylhydrazone, M. P.=50–51° C. (given in literature, M. P.=49–50° C.). The 2,4 - dinitrophenylhydrazone was also prepared and melted at 198–199° C. after recrystallization from ethanolethyl acetate.

Analysis: Calcd. for $C_{10}H_9O_4N_5$: N=26.61, H=3.45, C=45.62.

Found: N=27.02, H=3.21, C=45.96.

*Example 2*

Acrolein (67.2 g.) was dissolved in 125 ml. of absolute ethanol and 32.8 g. of liquid HCN were added. The mixture was cooled to +5° C. and 0.25 ml. of triethylamine were added. The temperature rapidly increased to about 50° C., and the reaction was then cooled to room temperature. After 16 hours at room temperature, the reaction was heated to reflux for 2.5 hours. The solvent was removed in vacuo, the residue was treated with 0.5 ml. HOAc to neutralize the remainder of the catalyst, and the residue was again diluted with alcohol. The concentration in vacuo was repeated and the resulting residue was treated with ether. The ether-soluble material was washed with water, and the excess ether was removed by distillation. The residue was subjected to distillation, and the product was collected over the range 66–120° C./3.4–1.6 mm. with some decomposition. The product was redistilled and purified beta-cyanopropionaldehyde was collected at 58–58.5° C./0.8 mm.

The maintenance of the reaction mixtures at room temperature or under refrigeration for the periods of time given in these examples is unnecessary and was merely for the purpose of permitting the two parts of the reaction to be carried out on separate days.

While numerous modifications of the invention have been described, other modifications are also possible without departing from the spirit of the invention.

We claim as our invention:

1. Process of producing compounds selected from the group consisting of beta-cyanoproprionaldehyde, alpha-methyl-beta-cyanopropionaldehyde, and beta-methyl-beta-cyanopropionaldehyde, which comprises reacting an aldehyde selected from the group consisting of acrolein, methacrolein, and crotonaldehyde, with hydrogen cyanide, in the presence of a lower aliphatic alcohol solvent and in the presence of a strong alkaline catalyst under substantially anhydrous conditions, at a temperature within the range of 50–100° C. for a period of from one to four hours.

2. Process of producing beta-cyanopropionaldehyde, which comprises reacting acrolein with hydrogen cyanide in the presence of a lower aliphatic alcohol solvent and in the presence of a strong alkaline catalyst under substantially anhydrous conditions, at a temperature within the range of 50–100° C. for a period of from one to four hours.

3. Process of producing alpha-methyl-beta-cyanopropionaldehyde, which comprises reacting methacrolein with hydrogen cyanide, in the presence of a lower aliphatic alcohol solvent and in the presence of a strong alkaline catalyst under substantially anhydrous conditions, at a temperature within the range of 50–100° C. for a period of from one to four hours.

4. Process of producing beta-methyl-beta-cyanopropionaldehyde, which comprises reacting crotonaldehyde with hydrogen cyanide in the presence of a lower aliphatic alcohol solvent and in the presence of a strong alkaline catalyst under substantially anhydrous conditions, at a temperature within the range of 50–100° C. for a period of from one to four hours.

5. Process of producing beta-cyanopropionaldehyde which comprises preparing a solution of acrolein and hydrogen cyanide in ethanol, adding a strong alkaline catalyst thereto, raising the temperature to within the range of 50–100° C., and maintaining the temperature within that range for a period of from one to four hours, the reaction being carried out under substantially anhydrous conditions.

6. Process of producing beta-cyanopropionaldehyde which comprises preparing a solution of acrolein and hydrogen cyanide in ethanol, adding thereto sodium ethoxide catalyst, raising the temperature of the reaction mixture to within the range of 50–100° C. for a period of from one to four hours, the reaction being carried out under substantially anhydrous conditions.

7. Process of producing beta-cyanopropionaldehyde which comprises preparing a solution of acrolein and hydrogen cyanide in absolute ethanol, adding triethylamine thereto, raising the temperature to within the approximate range of 50–100° C. for a period of from one to four hours.

DONALD T. WARNER.
OWEN A. MOE.

REFERENCES CITED

The following references are of record in the file of this patent:

UNITED STATES PATENTS

| Number | Name | Date |
|---|---|---|
| 2,166,600 | Leupold et al. | July 18, 1939 |

OTHER REFERENCES

Migrdichian: "Chem. of Org. Cyanogen Compds.," ACS Monograph #105, p. 221 (1947).
Mowry: Chem. Reviews, vol. 42, p. 230 (1948).